Dec. 11, 1928.
J. O. H. CAZENOVE
1,694,500
EGG BEATER
Filed May 21, 1926
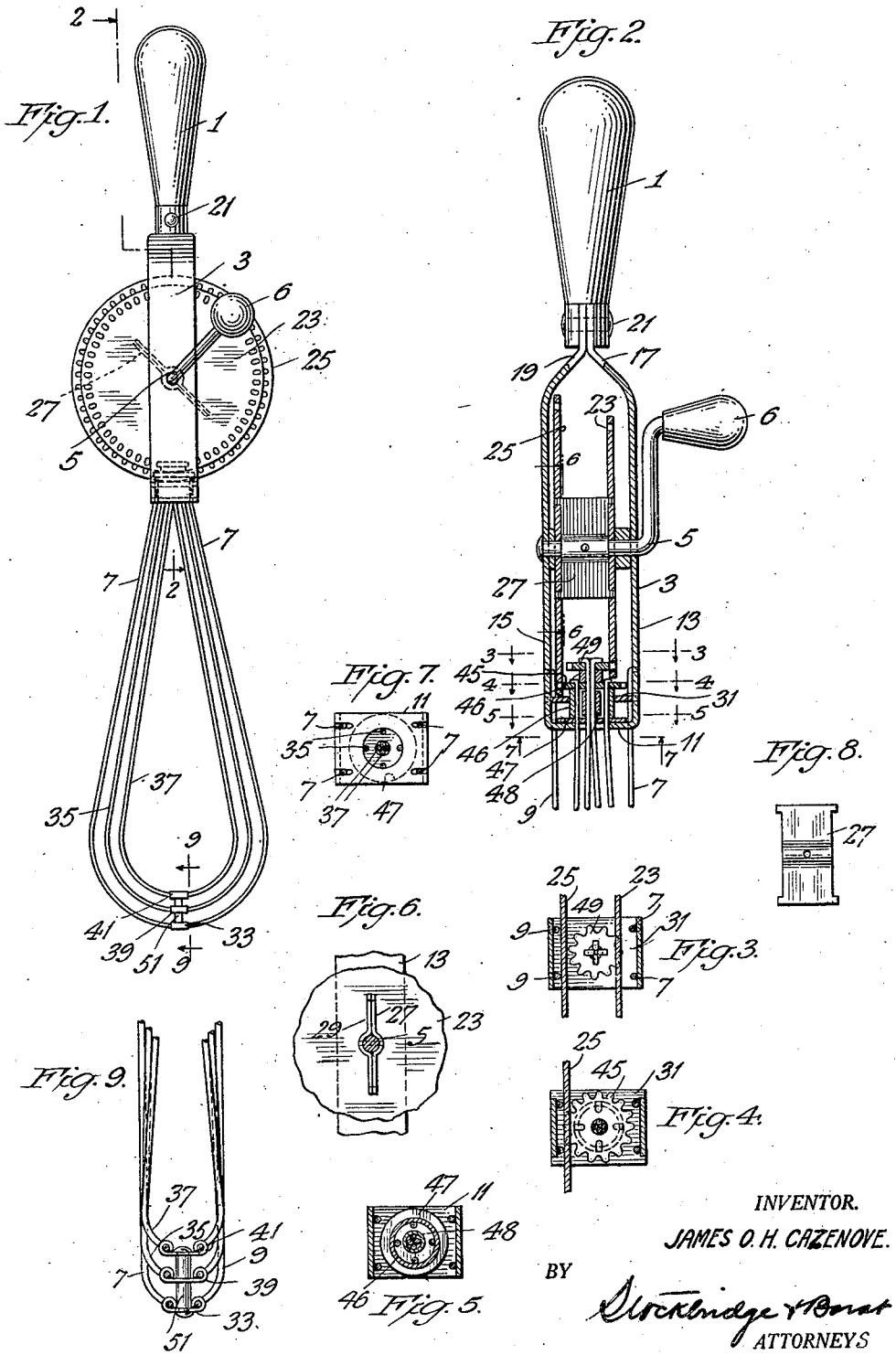
INVENTOR.
JAMES O. H. CAZENOVE.
BY
ATTORNEYS Patented Dec. 11, 1928.

1,694,500

UNITED STATES PATENT OFFICE.

JAMES O. H. CAZENOVE, OF NEW YORK, N. Y.

EGG BEATER.

Application filed May 21, 1926. Serial No. 110,651.

This invention relates to egg beaters or mixers for general use of the manually operable type commonly used around the household. Beaters of this type usually employ one or more sets of agitator blades mounted in a metal frame rotated by operating a handle upon a shaft to which is secured a master gear which in turn rotates the agitators. Another handle is usually employed to form a holding means for the complete device. These beaters are usually constructed out of light but stiff strip iron or wire or other suitable cheap material which is durable and inexpensive to work.

This invention relates more specifically to the type of beater usually found as a household utensil and employs two rotatable beaters and has for its purpose to construct a beater that is light, inexpensive and more efficient than those heretofore manufactured. In order to accomplish this result the beater is formed principally of wire and consists essentially of two rotatable beaters, one rotating entirely within the other and one rotating in a reversed direction relatively to the other.

Other objects and advantages will be apparent from the following description of one embodiment of the invention, and the novel features will be particularly defined in the appended claims.

In the accompanying drawings:

Fig. 1 is a side elevation of the beater constructed in accordance with this invention;

Fig. 2 is a section taken along line 2—2 of Fig. 1;

Fig. 3 is a section taken along line 3—3 of Fig. 2;

Fig. 4 is a section taken along line 4—4 of Fig. 2;

Fig. 5 is a section taken along line 5—5 of Fig. 2;

Fig. 6 is a view taken along line 6—6 of Fig. 2;

Fig. 7 is a section taken along line 7—7 of Fig. 2;

Fig. 8 is a detail view of one of the elements of the structure involved; and

Fig. 9 is a view taken along line 9—9 of Fig. 1.

The embodiment of the invention as illustrated in the drawings consists of the usual handle 1 attached to the upper frame member 3 which forms a support for the operating shaft 5 and carries the lower frame members 7, 9. The upper or main frame member 3 is constructed from strip iron and formed into a U-shape formation having a bottom portion 11 and two side arms or supports 13, 15. The two ends 17, 19 are brought together and fastened to the handle 1 by rivet 21.

The entire operating mechanism is mounted within the upper frame 3. For this purpose the side members 13, 15 are drilled or punched at approximately their centers to provide bearings for the horizontal shaft 5, and to which is clamped the two driving sprockets 23, 25 in the manner shown more particularly in Figs. 2 and 6. Shaft 5 may be supplied with the usual handle 6 if desired. The teeth of the sprockets 23, 25 may conveniently comprise radially arranged elliptical apertures around the peripheral portion of the sprockets and into which the teeth of cooperating pinions may protrude. Such a sprocket may easily be stamped in one operation from sheet material. Sprockets 23, 25 are held to the shaft in spaced parallel relationship by the spacer members 27, 29. These spacer members are formed with integral extending riveting lugs and are curved at their center portions to fit the shaft 5 snugly when their surfaces are brought together. The two spacers are riveted to the sprockets with their faces together, after which shaft 5 is inserted between the curved portion of the spacers and keyed thereto by means of a pin. Shaft 5 and the two sprockets are thereby securely mounted for rotation within frame 3.

Secured to and depending from the upper frame 3 are the lower frame members 7, 9 which consist of two wire members each being of a U formation having their upper extremities fastened to the side arms of the upper frame as illustrated more particularly in Fig. 2. These lower frame members extend through slots in the bottom portion 11 of the upper frame 3 close to the inner faces of the arms 13, 15. The extreme ends of the wire lower frame members 7 and 9 are bent sharply at right angles and inserted outwardly through apertures in the side arms 13, 15 and held in such position by a brace 31 which is positioned as illustrated, with its surface parallel to the end portion 11. This brace has cut out portions in the outer edges of its short ends, shown in Fig. 4, to allow passage of the four wire members 7, 9 and when in position holds these wire members rigidly against the flat surface of the side members as clearly illustrated. This brace is held from vertical movement by having integral lugs formed on its four corners and inserting these lugs through apertures in the side arms of the upper frame member. The two lower frame members being thus secured to the upper frame member are extended downwardly in U formation and clamped together at their lower curved ends by clamping element 33. This element consists of a flat strip of metal with a hole through the center and has its ends curled securely around the wire members 7 and 9, thereby holding the wire members securely in spaced relationship. The two lower frame members are in this manner clamped closer together at the lower extremity than at the upper extremity which of necessity causes these members to be curved inwardly at the bottom, thereby placing a tension upon the lower frame members which adds to their rigidity and firmness.

Within the lower frame are mounted the two beaters 35, 37, one entirely within the other, each composed of two bent wires with their four upper ends brought together at the top and their two lower curved ends securely held by clamps 39, 41 similar to clamp 33.

The four wires of the outer beater are brought together at the upper end and inserted through the center hole in the bottom portion 11 of the upper frame and through four apertures in a thrust disc 47 and thence through the hub of a pinion 45 and peened thereto, which pinion meshes with sprocket 25 to be rotated thereby. The two pairs of wires constituting the inner beater are held together at their lower ends by clamp 41 similar to clamp 33 and curved upwardly in a similar manner to the other beater blades, extended through the aperture in the center of the bottom portion 11 of the upper frame member, then through a single aperture in the thrust disc 47, which acts as a steady bearing, and then through a clamping sleeve 48 placed within the hub of the pinion 45 and thence through and secured to pinion 49. Pinion 49 is mounted to mesh with a sprocket 23 and adapted to be rotated thereby and rests upon the upper face of pinion 45 which forms a thrust bearing therefor.

The lower ends of the lower frame and the two beaters are secured together by means of a pin 51 which is inserted through the three clamps 33, 39 and 41, and upset at each end to prevent any vertical movement of the beaters relatively to the lower frame member. The clamp 33 is curved tightly and rigidly against pin 51, whereas clamps 39 and 41 are made with a loose fit around said pin so as to allow rotation of these clamps relatively to the pin which is held stationary by clamp 33.

It is to be noted that sprocket 25 meshes with pinion 45 upon one side of the axis of the pinions, whereas sprocket 23 meshes with pinion 49 upon the other side of the axis of the pinions, thereby causing the two beaters to be rotated in relatively opposite directions upon rotation of shaft 5. Also the two sprockets 23, 25 are constructed with different diameters to cause the beater to be rotated at different speeds of rotation as well as different directions of rotation.

From the above description of this device its operation is obviously clear and simple and is as follows: The operator grasps the device by handle 1 and rotates shaft 5 by means of handle 6, thereby turning sprockets 23, 25, which cooperate with pinions 45, 49 to cause the two beaters 35 and 37 to be rotated in relatively reversed directions and at different speeds of rotation. From the foregoing it is clear that a very efficient, compact and rapid beater is constructed adapted to be manufactured with a minimum amount of skilled labor and at a very low cost of production.

It is obvious that minor changes may be made without departing from the spirit of the invention, for example, the pinions may be stamped from flat material and supported vertically by tubular sleeves as indicated at 46 in Fig. 2.

Having thoroughly described my invention, what I claim is:

1. An egg beater including a handle, an upper frame attached thereto, a lower frame secured to said upper frame, two beaters mounted within said lower frame for rotation in relatively reversed directions, and means carried by said upper frame including two sprockets secured to a single shaft by spacer elements riveted to said sprockets and keyed to said shaft, said shaft being journaled horizontally in said upper frame.

2. An egg beater including an upper frame assembly comprising a horizontal shaft mounted therein, two sprockets carried by said shaft, a lower frame assembly supported from said upper frame assembly, two beaters mounted within said lower frame positioned one entirely within the other, and extending through said upper frame, pinion gears mounted on the ends of said beaters to cooperate with said sprockets to be rotated thereby in relatively opposite directions.

3. An egg beater comprising an upper frame, sprockets and pinions carried thereby, a lower frame secured to said upper frame, comprising two U-shaped wire members having their upper ends curved outwardly and extending through said upper frame and held against said upper frame by a clamping member, said wire members being secured together at their lower curved ends and adapted to encircle a plurality of beaters, said beaters being secured to said pinions and mounted for rotation in relatively opposite directions.

4. An egg beater, including an upper U-shaped frame, a U-shaped wire lower frame supported from said upper frame, comprising two curved wire members, said members being secured at their lower curved ends by clamps, two beaters mounted for rotation within said lower frame, one beater being entirely within the other beater, each of said beaters being formed of two U-shaped wire blades and being secured at their lower curved ends by clamps comprising disks having their ends curled around the curved ends of said beaters, and a single pin extending through and securing all of said clamps.

5. An egg beater including an upper frame having an aperture in the lower end thereof, a pair of wire beaters mounted for rotation one within the other supported below said frame and extending upwardly through said aperture, means including a pinion within said upper frame for rotating said beaters in relatively reversed directions and a thrust disk overlying said aperture between said pinion and the lower end of said frame, said disk having a central opening through which the wires of the inner beater pass and rotate and a plurality of spaced apertures surrounding said opening through which the wires of the outer beater pass whereby said thrust disk serves as a thrust bearing for said pinion and as a guide and support for said beater wires.

In witness whereof, I hereunto subscribe my signature.

JAMES O. H. CAZENOVE.